H. C. EICHMEIER.
BRAKE
APPLICATION FILED MAR. 10, 1919.
1,328,502.
Patented Jan. 20, 1920.
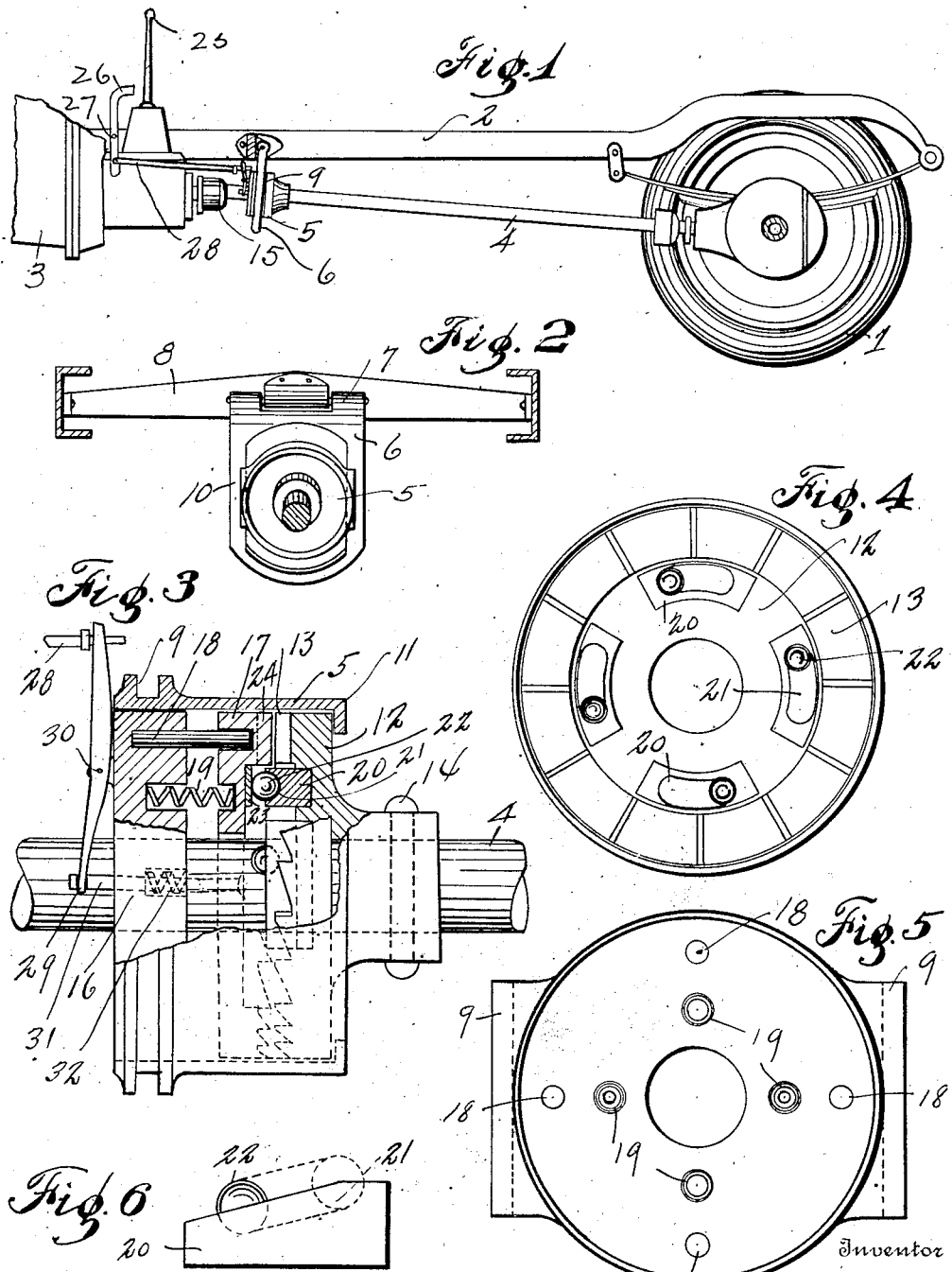
Inventor
Herman C. Eichmeier
By Herbert E. Smith
Attorney

UNITED STATES PATENT OFFICE.

HERMAN C. EICHMEIER, OF ST. MARIES, IDAHO.

BRAKE.

1,328,502. Specification of Letters Patent. Patented Jan. 20, 1920.

Application filed March 10, 1919. Serial No. 281,785.

*To all whom it may concern:*

Be it known that I, HERMAN C. EICHMEIER, a citizen of the United States, residing at St. Maries, in the county of Benewah and State of Idaho, have invented certain new and useful Improvements in Brakes, of which the following is a specification.

The present invention relates to improvements in clutches, designed particularly for use in connection with the driving mechanism or drive shaft of automobiles, auto-trucks, tractors, etc., to prevent the vehicle from "backing up," as for instance when the engine becomes stalled while vehicle is traveling up hill, the clutch, by holding the driving shaft against rotation, will thus prevent the car from rolling backward down hill.

Proper backward movement of the car is permitted and provided for, however, by the presence of a releasing device, actuated by the control lever of the automobile when said lever is moved to "reverse" position. Should the car start backward, accidentally, the reverse movement of the shaft, when the clutch is in operative position, will cause the clutch to engage and hold the shaft against further rotation. Normally, the clutch is held in disengaged or inoperative position, but the reverse movement of the shaft and the fixed clutch member thereon operates the cam elements forming part of the clutch, as will be hereinafter more fully described and claimed in the following specification and claims.

In the accompanying drawings one complete example of the physical embodiment of the invention is illustrated according to the best mode so far devised for the practical application of the principles of the invention.

Figure 1 is a partial side elevation showing so much of the driving devices of an automobile as is necessary to illustrate the application thereto of the invention.

Fig. 2 is a transverse view showing the side bars of the vehicle frame in section and the hinged bracket hanger thereon which supports the clutch in connection with the longitudinal driving shaft of the vehicle.

Fig. 3 is an enlarged view of the clutch, partly in section to more graphically illustrate the construction of the clutch.

Fig. 4 is a face view of one of the disks or plates of the clutch, which is held fixed on the shaft of the engine.

Fig. 5 is a face view of one of the loose members of the clutch, showing the casing of the clutch in section.

Fig. 6 is a detail perspective view of one of the cam blocks and ball.

In order that the invention may be readily understood the drawings illustrate, the usual form of wheel 1, chassis or automobile frame 2, the motor or engine casing 3 and the longitudinally extending driving shaft 4, these parts being of usual and standard make.

The clutch device as a whole is inclosed in a housing 5 in the form of an open ring that is supported in a hinged bracket or hanger 6, the hinge being shown at 7 attached to the cross arm or brace 8 bolted to the side bars of the chassis.

The bracket is hinged to support or retain the housing and its contained clutch, in such manner as to permit the usual movements of the driving shaft due to shocks of the car or automobile when traveling over rough roads, and for this purpose the housing has guide flanges 9 fitting over the edge bars 10 of the hanger bracket by means of which the movement of the driving shaft and the frame are compensated for.

The housing is in the form of a cylinder open at both ends except for the annular flange 11, which fits against the periphery or outer edge of the fixed clutch member or disk 12 formed with the teeth 13 in its working face. This disk is fixed, as by the pin 14, on the shaft 4 adjacent the universal or ball joint 15 of the shaft, and the disk revolves at all times with the shaft.

Two other elements as the outer plate 16 and the intermediate disk 17 comprise the clutch, the plate 16 and intermediate disk 17 both being loose on the shaft and coupled together by pins as 18, illustrated as four in number, but although the plate and disk are coupled to revolve together, it should be noted that they are laterally movable with relation to each other, or rather the disk may be moved relatively to the plate through the instrumentality of protractile spring 19 seated in alined complementary sockets in the plate and disk.

In addition to the teeth 13, on the face of the disk 12, there are four cam devices carried by this disk each comprising a cam block 20 provided with an inclined race or cam groove 21 in which the ball 22 may move, and when the clutch members are disengaged these balls travel around on the circular track ring or plate 23 on the adjoining face of the intermediate disk. The circular track for the balls is located just within the circular series of rack teeth 24 of the intermediate disk or clutch member, these teeth being complementary with and adapted to engage the teeth 13 of the disk 12 when the clutch is engaged.

The normal position of the clutch members is indicated in Fig. 3 with the teeth disengaged and the fixed clutch member revolving with the shaft within the flanged housing, and the balls at the top of the cam grooves. Now should the standing car be on a hill and the car start to run backward down hill, the driving shaft 4 revolves in the reverse direction and the balls are permitted to roll or are caused to travel down the grooved cam or incline, receding into the groove and permitting the two toothed members of the clutch to engage, whereupon the rotation of the shaft is stopped.

A release device is provided so that the shaft may be reversed when desired, and this device is actuated by the control lever 25 of the engine contacting with an actuating or release lever 26, pivoted at 27 on a suitable fixed support, and provided with a push bar 28 which in turn is connected with the forked lever 29, pivoted at 30 to the clutch plate 16. The forked lever has a pair of pull pins 31 which pass through openings in the plate 16 wherein are provided springs 32 and these pins are connected to the intermediate disk 17 so that this disk may be drawn toward the outer plate of the clutch, against the tension of the springs 19, until the teeth of the two clutch disks are disengaged, thus leaving the shaft free to revolve with its single disk 12.

In this manner a device is provided that will automatically prevent the backward rotation of the shaft when not desired, and means are provided by which this backward rotation of the shaft will be permitted whenever required, thus locking the car against accidental movement downhill in a backward direction.

Claims:

1. In a brake device of the character described, the combination with a drive shaft, of a disk secured thereto for rotation therewith and having teeth, a relatively stationary member disposed upon one side of the disk, guide elements carried by said member, a second disk slidable upon the guide elements and having teeth to engage with the first named teeth, automatic means to move the second disk toward the first disk, and means normally serving to retain the second disk spaced from the first disk, and automatically operated upon the rotation of the first named disk in a reverse direction for releasing the second named disk so that it is free to move toward the first named disk.

2. In a brake device of the character described, the combination with a drive shaft, of a disk secured thereto for rotation therewith and having teeth, a relatively stationary member disposed upon one side of the disk, guide elements carried by said member, a second disk slidable upon the guide elements and having teeth to engage with the first named teeth, yielding means to move the second disk toward the first named disk, means serving to normally retain the second disk spaced from the first disk, and automatically operated upon the rotation of the first named disk in a reverse direction for releasing the second disk so that it is free to move toward the first disk, and separate means to move the second disk away from the first disk.

3. In a brake device of the character described, the combination with a drive shaft, of a disk secured thereto for rotation therewith and provided upon one side with teeth, inclined blocks secured to the same face of the disk, a second disk having an opening to receive the drive shaft and provided upon its inner face with teeth to coact with the first named teeth, an annular track carried by the inner face of the second named disk, clutch elements engaging the inclined blocks and the annular track, a relatively stationary member arranged near the second disk, guide elements carried by the member and slidably supporting the second disk, springs arranged between the member and the second disk, and separate means to move the second disk away from the first disk.

In testimony whereof I affix my signature.

HERMAN C. EICHMEIER.